(12) United States Patent
Block et al.

(10) Patent No.: US 8,823,931 B1
(45) Date of Patent: Sep. 2, 2014

(54) LASER WAVELENGTH TRACKING VIA DIRECT LASER MEASUREMENT AND OPTICAL FILTERS IN A SPECTROMETER

(71) Applicant: Redox Biomedical, Inc., Menlo Park, CA (US)

(72) Inventors: Ueyn L. Block, Menlo Park, CA (US); Stephen Waydo, Campbell, CA (US); Rudolf J. Hofmeister, San Jose, CA (US)

(73) Assignee: Redox Biomedical, Inc., Menlo Park, CA (US)

( * ) Notice: Subject to any disclaimer, the term of this patent is extended or adjusted under 35 U.S.C. 154(b) by 137 days.

(21) Appl. No.: 13/674,779

(22) Filed: Nov. 12, 2012

Related U.S. Application Data

(60) Provisional application No. 61/558,869, filed on Nov. 11, 2011.

(51) Int. Cl.
*G01J 3/44* (2006.01)

(52) U.S. Cl.
CPC .................................. *G01J 3/4412* (2013.01)
USPC ......................................................... 356/301

(58) Field of Classification Search
CPC ......... G01J 3/02; G01J 3/0218; G01J 3/0237; G01J 3/0265; G01N 21/65
USPC ................................ 250/338.1, 458.1, 459.1
See application file for complete search history.

(56) References Cited

U.S. PATENT DOCUMENTS 6,473,174 B1 * 10/2002 Ballast et al. ................. 356/301
7,397,561 B2 * 7/2008 Yoo ............................... 356/328

* cited by examiner

*Primary Examiner* — Kiho Kim
(74) *Attorney, Agent, or Firm* — Fenwick & West LLP

(57) ABSTRACT

An optical system is described where a portion of the Rayleigh light arriving from a sample is incident on the same image sensor as a Raman signal to be measured. As a result, the difference in wavelength between the measured Rayleigh line and the measured Raman peaks may be determined directly without the need for a separate sensor, optical path, or calibration.

17 Claims, 5 Drawing Sheets

LASER WAVELENGTH TRACKING VIA DIRECT LASER MEASUREMENT AND OPTICAL FILTERS IN A SPECTROMETER

CROSS REFERENCE TO RELATED APPLICATION

This application claims priority under 35 U.S.C. §119(e) to U.S. Provisional Patent Application Ser. No. 61/558,869, filed Nov. 11, 2011, entitled "Laser Wavelength Tracking Via Direct Laser Measurement and Optical Filters in a Spectrometer," which is incorporated herein by reference in its entirety.

BACKGROUND OF THE INVENTION

1. Field of the Invention

This invention relates generally to spectroscopy. More particularly, it relates to spectroscopic filters.

2. Description of the Related Art

Raman spectroscopy involves measuring a spectrum which is Raman shifted relative to an excitation wavelength. The excitation wavelength may be narrowband light (usually laser light) at any frequency convenient to the spectroscopist. When this excitation light scatters from the analyte and subsequently is detected by the spectrometer, it is called the Rayleigh line. The signal spectrum consists of a number of Raman shifted peaks, each at a distinct light frequency relative to the Rayleigh line. The magnitude of the frequency shift is determined by the nature of the molecular bonds of the particular analyte generating the peak. In order to obtain usable data from Raman shifted peaks, it is important that the spectrometer provide an accurate measurement of the shift of each peak.

In a spectrometer, every wavelength of light is imaged to a unique location on the spectrometer's sensor. The distance between nearby wavelengths is proportional to the dispersion of the spectrometer's dispersive element. Examples of dispersive elements include grating(s), prism(s), or grism(s). The spectrometer may be calibrated using measurements of reference light from a reference light source detected at different parts of the detector. An example of a reference light source is a neon light source. By tuning the wavelength of the reference light source and measuring the shift in location of the peak on the detector, the wavelength of every peak in a signal spectrum may be calibrated. Wavelength ($\lambda$) is easily converted to frequency (f) through the equation $\lambda=nc/f$; where n is index of refraction and c is the speed of light. Once the spectrometer has been calibrated, the frequency difference and Raman shift between peaks may be determined.

Correlating the measurements of the Raman shifted peaks to the measurement of the Rayleigh line is difficult, however. The Rayleigh line is traditionally not part of the signal. The Rayleigh line is so intense its presence saturates the spectrometer's detector, thereby making it very difficult to measure the Raman signal of interest. Typically, the Rayleigh line is physically blocked and/or is filtered from reaching the detector with optical interference filters that reduce the Rayleigh line by 8-12 orders of magnitude. Additionally, all non-imaged stray Rayleigh light is also blocked and/or filtered from reaching the detector to eliminate background glow, halos, or optical 'ghosts' which would otherwise obscure the Raman signal of interest.

Because the Rayleigh line is not incident on the detector, its wavelength/frequency must be measured with any number of alternate methods. Accurate calibration between the measurement of the Rayleigh line and the measurements received from the detector is a source of error that limits the accuracy of the spectrometer. In addition, a spectrometer's output may change over time if the spectrometer is disturbed in any way. For example, if the detector array shifts inside the instrument, e.g., caused by the device being dropped, then the spectrum will shift and the calibration will no longer be accurate. This leads to degradation in spectrometer accuracy over the life of the device.

SUMMARY

An optical system including a Raman spectrometer is described where a portion of the Rayleigh light arriving from a sample is incident on the same image sensor as a Raman signal to be measured. As a result, the difference in wavelength between the measured Rayleigh line and the measured Raman peaks may be determined directly without the need for a separate sensor, optical path, or calibration.

BRIEF DESCRIPTION OF THE DRAWINGS

The invention has other advantages and features which will be more readily apparent from the following detailed description of the invention and the appended claims, when taken in conjunction with the accompanying drawings, in which:

DETAILED DESCRIPTION OF THE PREFERRED EMBODIMENTS

Figure 1:
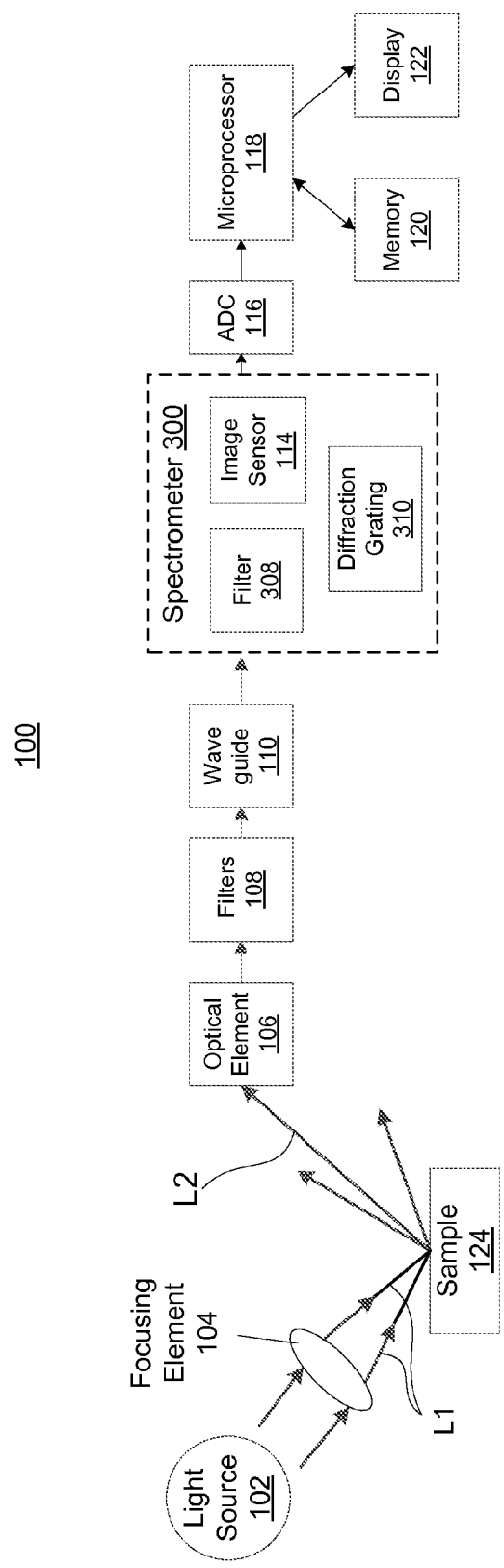
FIG. 1 is a block diagram of an optical system, according to one embodiment.

Optical System Configured to Measure Raman and Rayleigh Light

An optical system includes a spectrometer that allows a portion of the Rayleigh light incident from a sample to be imaged on the same image sensor (or detector) as a Raman signal being measured. As a result, the difference in wavelength between the measured Rayleigh line and the measured Raman peaks may be determined directly without the need for a separate sensor, optical path, or calibration. Furthermore, if the spectrometer is disturbed in such a way that might affect measurement as described above, the calibration remains accurate because the Rayleigh line measurement will move at least partially in tandem with the measured signal.

In the optical system, rather than rejecting all of the Rayleigh light, the optical system includes one or more filters to block most of the Rayleigh light and allow a portion of the Rayleigh light to be transmitted through to be incident on an image sensor. The small portion of Rayleigh light that is allowed to reach the image sensor does not mask the Raman peaks that are also to be measured by the image sensor. The intensity of the Rayleigh light incident on the image sensor is bright enough to be measured accurately, but not so bright so as to saturate the image sensor. In one embodiment, the filter/s reduce the intensity of the Rayleigh line by 6-10 orders of magnitude in comparison to unblocked Rayleigh light. In one embodiment, the intensity of the Rayleigh light incident on the image sensor is not so intense as to saturate the image sensor, nor so weak as to have excess measurement noise.

In a first embodiment, the optical system allows a significant amount of Rayleigh light to enter its back end. The start of the back end of the optical system is at the entrance slit of the optical system's spectrometer. The portion of the optical system between the entrance slit of the spectrometer and the image sensor is the optical system's back end. The back end of the optical system may also be referred to as the spectrometer portion of the optical system. The portion of the optical system between the light source and the entrance slit of the spectrometer is the optical system's front end. In this embodiment, filtering is performed by interference filters after light enters the back end. Since interference filters do not absorb the blocked light, but merely reflect it, this Rayleigh light will scatter around inside the back end of the optical system until it is either finally absorbed by blackened walls of the optical system, or until it is absorbed by the image sensor as stray light. In the latter case, the stray light absorbed by the image sensor will be converted to electrons and detected as noise on the spectral measurement.

In a second embodiment, all filtering is performed at the front end of the optical system before light enters the optical system's back end. Any remaining unfiltered stray light will be passed through the slit and will be imaged on the detector.

Figure 3:
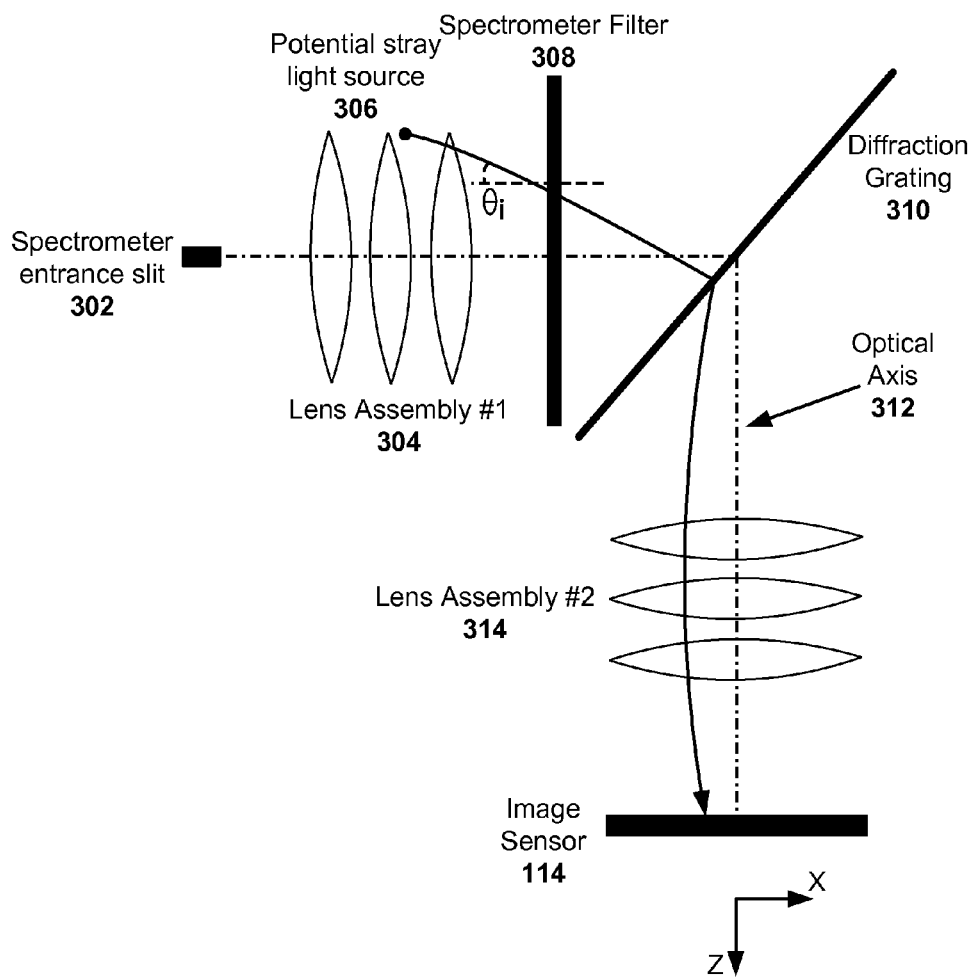
FIG. 3 illustrates a spectrometer of an optical system, according to one embodiment.

In a third embodiment of the optical system 100, illustrated in FIGS. 1 and 3, filtering is performed both prior to light entering the spectrometer 300 and after light enters the spectrometer 300. The optical system 100 includes a light source 102 (e.g., a laser), a focusing element 104, an optical element 106, one or more front end long-pass filters 108, a waveguide 110, a spectrometer 300 including a long-pass spectrometer filter 308 and an image sensor 114, an analog-to-digital (ADC) converter 116, a microprocessor 118, a memory 120 and a display 122. The spectrometer 300 also includes other elements described further with respect to FIG. 3 below. In other embodiments, the spectrometer 300 may include fewer or additional components. For example, parts of the optical system 100 described herein as being outside the spectrometer 300 may instead be made part of the spectrometer, and vice versa.

The light source 102 provides light in the near-infrared wavelength range of 700-1700 nanometers. In an embodiment, the light source 102 is a laser such as a diode laser. Other examples of light sources 102 include one or more light-emitting diodes, a gas discharge lamp or a high-intensity discharge lamp. Exemplary gas discharge lamps include fluorescent, induction, hollow cathode, neon, argon, plasma and xenon flash lamps. Exemplary high-intensity discharge lamps include carbon arc, ceramic discharge metal halide, hydrargyrum medium-arc iodide, mercury-vapor, metal halide, sodium vapor, sulfur and xenon arc lamps.

Light L1 from light source 102 is directed into the focusing element 104 which directs light towards a sample 124 (e.g., tissue or skin). The incident light L1 from the light source 102 is focused onto the sample 124 with the focusing element 104. The focusing element 104 may include one or more filters, lenses and/or mirrors. A portion of the light L1 is reflected by the sample 124. The portion reflected by the sample 124 includes reflected light L2. Reflected light L2 is collected by the optical element 106. The reflected light L2 includes Rayleigh light that has been elastically scattered from the sample 124, and Raman light that has been inelastically scattered from the sample 124.

The reflected light L2 collected by the optical element 106 and directed towards front end long-pass filters 108. The optical element 106 may include one or more filters, lenses and/or mirrors. Filters 108 and 308 are described further below in the section on filter design.

Light passing through filters 108 is transferred to the waveguide 110 to the entrance of the back end of the optical system (i.e., spectrometer 300). The operation of spectrometer 300 is further described with respect to FIG. 3 below. Briefly, additional filtering is performed using spectrometer filter 308, and some light reaches image sensor 114 after passing through a dispersive optical element (e.g., diffraction grating 310). The image sensor 114 may be constructed using a photodiode array, a CMOS image sensor, or a CCD image sensor. Although only a single image sensor 114 is described, the term image sensor 114 also meant to refer to implementations using an array of image sensors (e.g., an array of photodiodes).

In one implementation, the image sensor 114 outputs an analog signal. The analog signal from the image sensor 114 is digitized by an analog-to-digital converter (ADC) 116. The digitized signal is processed by a microprocessor 118 to obtain an analyte concentration value which is stored in a memory 120 and which may be displayed on optional display 122. The system 100 may also include an optional wireless transceiver (not shown) for transmitting data over a wireless network to a remote device so that analyte concentration values may be displayed on the remote device. Exemplary remote devices include a cell phone, a smart phone, a smart watch, a personal digital assistant and/or a computer.

FIG. 3 illustrates the spectrometer 300 of the optical system, according to one embodiment. The spectrometer 300 of the optical system 100 includes a spectrometer entrance slit 302, a first lens assembly 304, a spectrometer filter 308, a diffraction grating 310, a second lens assembly 314, and the image sensor 114.

Light entering slit 302 is collimated by a first set of lenses (first lens assembly) 304. The collimated light travels substantially parallel to an optical axis 312 of the spectrometer. The collimated light is incident upon another long-pass filter (or spectrometer filter) 308. Together with filters 108, the spectrometer filter 308 prevents excess Rayleigh and stray light from reaching the image sensor 114. The spectrometer filter 308 is physically separated a physical distance from the long-pass interference filters 108 and, additionally, a waveguide 110 separates the front end filters 108 and spectrometer filter 308. As a result, the spectrometer filter's 308 performance is not altered by any interference effects with filters 108.

Light passing through spectrometer filter 308 passes through a diffraction grating 310, and is then focused by the second set of lenses (second lens assembly) 314. The second set of lenses focus the light onto the surface of the image sensor 114. Each set of lenses 304 and 314 acts as a single multi-element lens assembly and may be composed of one, two, three, or more individual lenses.

The components of the optical system 100 are enclosed in a cavity (not shown). Further, each optical element may enclosed in a separate cavity from every other (though this is not strictly required for all elements). Generally, enclosure helps prevent stray light from leaking between elements. For example, the spectrometer filter 308 divides the cavities before and after it, in order to prevent stray light from leaking and reaching the image sensor 114 without having to first pass through the spectrometer filter 308.

Figure 4:
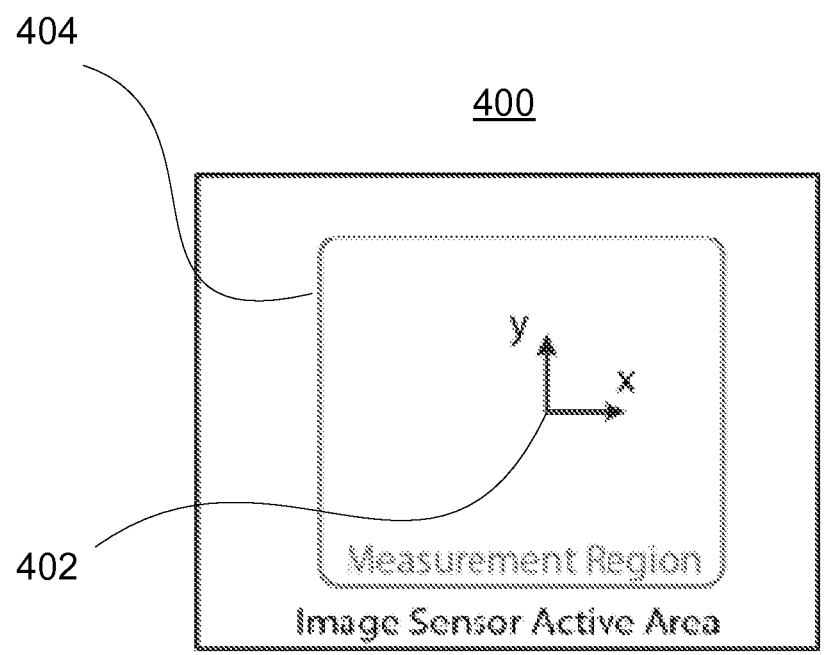
FIG. 4 illustrates an active area of an image sensor in a spectrometer, according to one embodiment.

FIG. 4 illustrates the active area 400 of the surface of the image sensor 114, according to one embodiment. FIG. 4 also illustrates the point 402 where the optical axis 312 intersects the sensor 114, and a measurement region 404 on the image sensor 114 from which Raman and Rayleigh data will be recorded. Depending on the implementation and optical system 100 design, the measurement region 404 may be a small portion of the total active area 400 or it may cover substantially all of the active area. The optical axis 312 intersection point 402 (e.g., x=0, y=0) may or may not be located at the center of the image sensor 114.

Filter Design

The performance of filters 108 and 308 changes as a function of angle of incidence. As the angle of incidence increases (i.e., off of the optical axis 312), the spectrum of light transmitted by the filters 108 and 308 typically "blue-shifts", i.e., moves toward lower (or shorter) wavelengths. Because of this effect, wavelengths of light that would otherwise be in the rejection band of the filter at normal incidence may be able to pass through the filter when incident at a sufficiently high angle relative to normal incidence. For a given wavelength of light that is rejected by the filter if incident at a normal angle (i.e., along the optical axis), the angle of incidence at which that same light is transmitted is referred to as the critical angle of the filter. The critical angle is wavelength dependent, and also dependent on the design of the filter. Some stray light passing through the filters in this manner will arrive at the image sensor 114.

A significant amount of the Raman and Rayleigh light scattered from the sample 124 will not be traveling directly along the optical axis (e.g., 312) of the optical system 100. For example, some light will scatter off interior surfaces of the system, including the filters 108 and 308 themselves. As a result, this light may come into contact with the filters 108 and 308 at angles of incidence higher than the critical angle. This light is transmitted through the filters 108 and 308.

To mitigate the effect of this stray light passing through filters 108, spectrometer filter 308 is designed so that the critical angle of the filter 308 is high enough so that stray light passing through the filter 308 forms an image off of the image sensor 114, or at least close enough to the edge of the active area of the image sensor 114 to be out of band of the measurement region (e.g., the Raman signal of interest) of the image sensor 114. A high critical angle is achieved by designing the filter 308 so that it has a very wide angular band of rejection at the Rayleigh wavelength. The filter 308 is further designed to transmit a precisely controlled amount of Rayleigh light at near-normal incidence angle.

If the blocking power of the long-pass filters 108 and 308 are chosen appropriately, an acceptable level of laser light will reach the detector, which may be used to track the laser wavelength during spectral measurements. In an embodiment where laser wavelength tracking is not desired, the blocking ability of the filters 108 and 308 may be tailored such that no detectable amount of Rayleigh light reaches the image sensor 114.

In both of the above cases, however, the spectrometer filter 308 performs another function as well. The spectrometer filter 308 reflects a large amount of laser light back toward the entrance slit 302, which causes this light to eventually strike a variety of surfaces: mechanical entrance slit 302, mounts, lenses, the waveguide 110, etc. This light may scatter in any direction and thus become stray light. As described above with respect to filters 108, this stray light may pass through the spectrometer filter 308 with very little attenuation if it approaches the filter at an incidence angle $\theta_i$ larger than the filter's 308 critical angle.

An example of such a potential stray light source 306 is illustrated in FIG. 3. Although FIG. 3 shows just one potential ray of stray light, in practice there will be many stray laser light rays emanating from the interior surfaces of spectrometer 300 located between the entrance slit 302 and the spectrometer filter 308. Each of these rays will pass through the spectrometer filter 300 with an incidence angle, ranging between −90° and +90°, and thus experience an amount of blocking by filter 308 that is a function of the incidence angle.

When this happens, stray light may reach the image sensor 114 and strike in a location where the Raman signal is present, inducing noise in the measured Raman signal. Since the stray light emanates from a variety of surfaces located between the slit 302 and the spectrometer filter 308, and because the stray light may travel in nearly any direction, stray light has the ability to cause an unwanted noise signal to be present across the entire surface of the image sensor 114.

To reduce this effect, the spectrometer filter 308 is designed to prevent the stray light from interfering with data collection. The spectrometer filter 308 is constructed of multiple layers of material. The performance of the optical filter 308 across different angles of incidence is a function of the specific design of those multiple layers. The performance of the optical filter 308 across different angles of incidence is also a function of the choice of materials used in the layers.

Two approaches are outlined to aid in the design the spectrometer filter 308 to reduce the amount of stray light that lands on the measurement region 404 of the image sensor 114. In method A, reverse ray tracing through the optical system 100 is used. In method B, an analytical approximation of reverse ray paths is used. These methods may also be used together to design filter 308.

Both methods use the principle of ray reversibility, which states that a ray of light in an optical system will retrace the same path if reversed in direction. Based on this, the filter 308 may be designed by selecting a region on the image sensor 114 where the presence of stray light is undesirable. Working backwards in the optical system 100 from the selected region, a filter 308 design is determined that blocks stray light from the selected region. In one embodiment, the selected region is the measurement region 404. Thus, the filter 308 is designed to prevent stray light from reaching the measurement region 404. In this filter 308 design, some stray light will be present on the image sensor 114 active area 400 outside the measurement region 404, however this is acceptable as this part of the active area is not used for measuring Raman and Rayleigh light.

Figure 5:
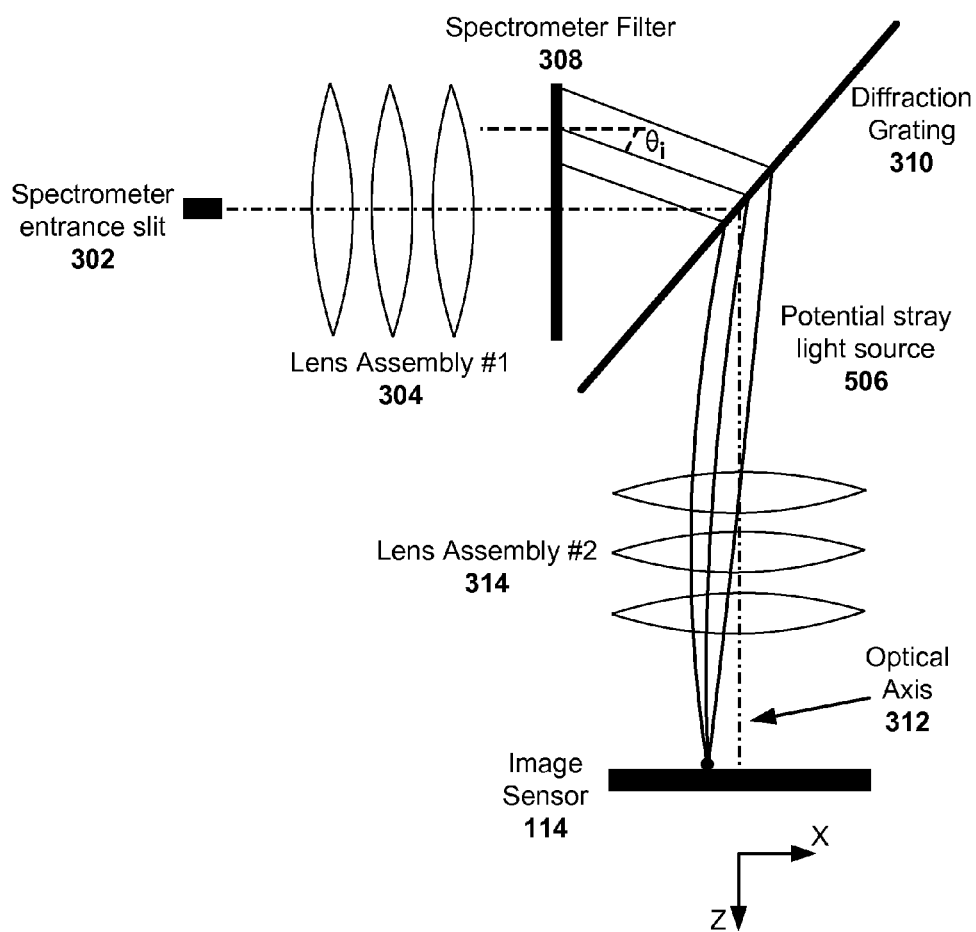
FIG. 5 illustrates modeling the path of virtual rays emanating from the image sensor's active area backwards through an optical system in order to design a spectrometer filter, according to one embodiment.

As illustrated in FIG. 5, to perform method A, optical ray tracing computer software is used to model the path of "virtual" rays 506 emanating from the image sensor's 114 surface backwards through the optical system 100. Reverse ray tracing modeling is performed at the wavelength of the Rayleigh light because the diffraction grating 510 routes light rays as a function of their wavelength, and because the Rayleigh light represents almost all of the stray light that is to be blocked. The proposed angular response of the spectrometer filter 508 is included in the model of the path of the virtual rays 506. The proposed angular response of the spectrometer filter 508 can be used to determine the amount of optical blocking experienced by any of these backwards virtual rays. By numerically analyzing a large number of backwards-traveling virtual rays using computer modeling, the optical blocking by the filter 508 may be plotted as a function of position on the active area 400 of the image sensor 114. This modeling may be repeated for a variety of different filter specifications to determine a desired a filter specification. For example, this process may be repeated until a filter 308 specification is found that has a sufficient blocking over the entire measurement region 404 of the image sensor 114.

Method B assumes that the image sensor 114 lies in the focal plane of the second lens assembly 314. Consequently, a bundle of virtual, backwards-traveling rays originating from a single position on the surface of the image sensor 114 will all be substantially parallel after passing backwards through the second lens assembly 314. Since these rays have the same wavelength (the wavelength of the Rayleigh light) and are parallel, they will be steered in the same direction after passing through the diffraction grating 310, and will therefore pass through the spectrometer filter 308 with the same angle.

Based on this, the amount of optical blocking of stray light for any position on the active area can be approximated by calculating (1) the angle of the backward-traveling rays after they exit the second lens assembly 314 using the paraxial approximation, (2) the angle of the rays after diffraction using the diffraction equation, and (3) recording the filter's 308 blocking for this angle of incidence. In order to complete (1) through (3), the rays' angles in 3-dimensional space must properly be accounted for. Note, for example, that FIG. 3 and FIG. 5 only show the angle within the plane of the spectrometer, and thus the illustrated perspective does not account for the rays' angles in 3-dimensional space. Computer modeling may be used to complete steps (1)-(3) of method B.

Using the results of steps (1)-(3), the filter's 308 optical blocking is processed (e.g., graphically plotted) as a function of position on the active area 400 of the image sensor 114. The computer modeling of method B may be repeated for a variety of different filter specifications to determine a desired filter specification. For example, this process may be repeated until a filter 308 specification is found that has a sufficient blocking over the entire measurement region 404 of the image sensor 114.

Both methods (A) and (B) can be used to determine the minimum required critical angle of a spectrometer filter 308 that blocks a sufficient amount of stray light from the measurement region 404 of the image sensor 114 so as to prevent interference with the measurement of Raman light in the measurement region 404.

Filter Specifications

In one embodiment of the optical system 100, a single optical density (OD) 12 interference filter is used as spectrometer filter 308, and filters 108 are not needed. In theory, one may design a filter that performs at this level, and in the future such a filter may be used. Currently, however, optical densities above approximately OD 7 are impractical and/or impossible to achieve.

In other embodiments, multiple (e.g., two, three, or more) OD 6 long-pass interference filters 108 are cascaded in series back to back along the optical axis of the optical system. The filters are OD 6 at the wavelength of the Rayleigh light. Due to filters 108, light traveling nearly parallel to the optical axis of the optical system 100 should therefore be reduced in power by approximately 18 orders of magnitude. However, due to scattered light reflecting off interior surfaces and the filters 108 themselves, filters 108 reduce the intensity of transmitted light (versus incident light) by significantly less than the 18 orders of magnitude ideal of the three filters' blocking abilities at normal incidence.

Interference filters cannot easily be cascaded. Further, two OD (optical density) 6 filters do not provide OD 12 blocking. Instead, they provide blocking in the range of OD 6 plus or minus a wavelength-dependent amount. This is due to optical interference between the filters in conjunction with the optical interference within each filter. As a result, the performance of two nearly parallel filters placed back-to-back may actually be worse than the performance of a single filter.

To improve the performance multiple filter embodiments, filters 108 in the optical system 100 may be mounted at different angles with respect to each other, e.g., not parallel to each other. In one embodiment, the optical system comprises three interference filters 108 in the front end of the optical system 100. The first filter is positioned at a 12-degree angle to normal in the vertical plane (i.e. perpendicular to the optical axis). The second filter is positioned at normal incidence. The third filter is positioned at an 8-degree angle to normal in the horizontal plane. In one embodiment, the three filters are arranged almost back to back, separated only based on their relative angular orientations.

Another mechanism to improve the performance of multiple filter arrangements is to physically separate the filters so that interference between them is minimized. However, for small-scale optical systems and spectrometers, space is at a premium, and consequently separating filters requires using up valuable space. In one embodiment, the front end of the optical system is reasonably isolated from the back end of the optical system, for example by using a waveguide between the front and back ends of the system. In the embodiment illustrated in FIGS. 1 and 3, filters 108 are physically separated a distance from filter 308 to reduce interference between the filters.

Figure 2:
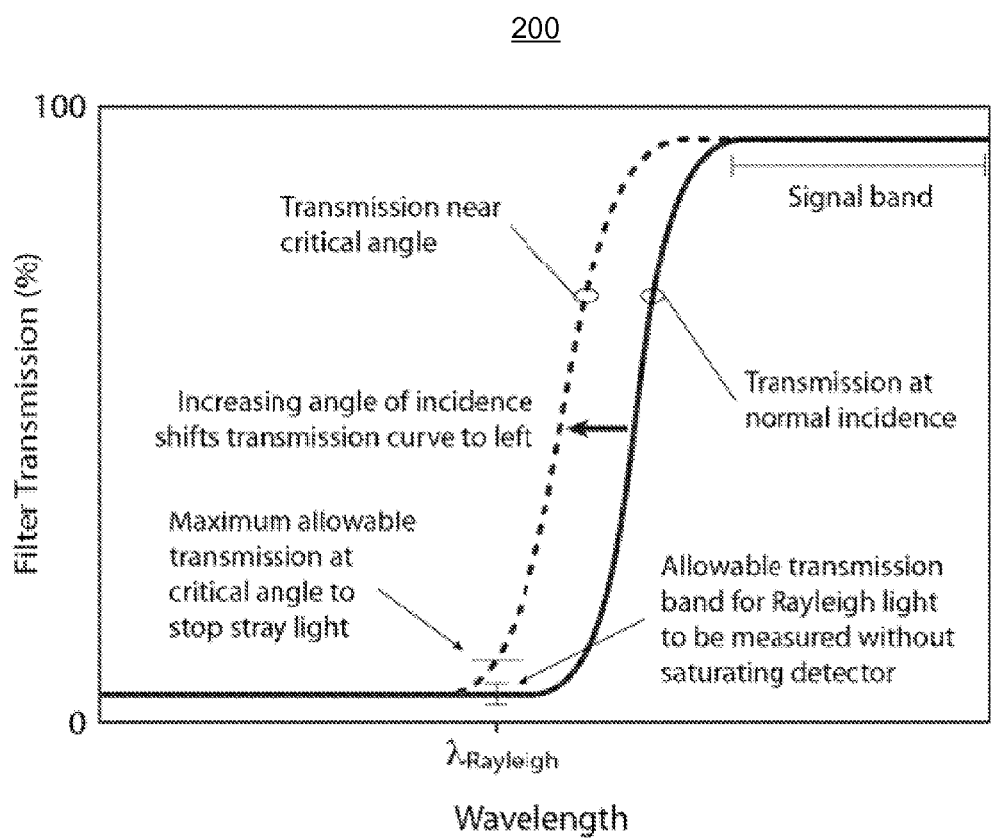
FIG. 2 is a graph of a transmission profile of a spectrometer filter, according to one embodiment.

FIG. 2 is a graph 200 of a transmission profile of spectrometer filter 308, according to one embodiment. The filter 308 illustrated in FIG. 2 is designed to cause stray light to be imaged out of the measurement region 404 of the image sensor 114, while still transmitting a small amount of Rayleigh light to be received at normal incidence in the measurement region 404 of the image sensor 114. The design of the filter 308 depends upon the imaged and stray light parameters of the optical system 100. The amount of stray light passing through filters 108 and collected by the waveguide 110 affects the design of the spectrometer filter 308.

Laser Wavelength Tracking

The optical system is configured to output data in the form of a measurement of light intensity as a function of wavelength (e.g., in nanometers (nm)). In one implementation, the microprocessor 118, or another computing system is configured to use the output of the optical system 100 to measure the Raman signature of an analyte (e.g., glucose). The Raman signature of the analyte is arrived at, in part, by subtracting off the Raman signatures of any interfering substances that are not the analyte. These interfering Raman peaks exist at fixed offsets from the wavelength of the Rayleigh light that is also detected by the image sensor 114. Thus, to quantitatively determine the Raman signature of analyte, the wavelengths of these interfering Raman peaks need to be determined so they can be subtracted out.

In existing systems, this issue is addressed by using a calibrated and stabilized laser source that always outputs a particular known wavelength. Such an approach requires the laser to be precisely temperature controlled, which is impractical in a compact, portable Raman system.

Instead, the laser wavelength is measured or estimated when each measurement of the Raman spectrum is taken. The laser wavelength is measured by imaging the portion of Rayleigh light allowed to pass through the optical system 100 onto the image sensor 114 along with the Raman spectrum. The measured Rayleigh light wavelength is used to project the Raman spectrum onto a single scale with the Raman measurements. Consequently, the wavelengths of the Raman signature of the analyte and the interfering Raman peaks can be determined.

The Raman scale and the offsets of the interfering Raman peaks are measured in wavenumbers, typically with units of $cm^{-1}$, where the wavenumber $\eta$ (in $cm^{-1}$) corresponding to wavelength λ (in nm), with the Rayleigh excitation wavelength being $\lambda_0$ (also in nm), is given by $$\eta = \left(\frac{1}{\lambda_0} - \frac{1}{\lambda}\right) * 1 \times 10^7 \quad (1)$$

(1)

Further wavelengths may be correlated with particular pixels in the measurement region 404 of the active area 400 of the image sensor 114. Converting wavelengths to wavenumbers accurately and robustly allows for better removal of unwanted Raman peaks from the measured signal.

Many methods for ascertaining the Rayleigh light wavelength are possible. In one embodiment, it is measured directly with a wavelocker integrated into the light source 102. In another embodiment, it is measured with a separate spectrometer or separate portion of the same spectrometer.

In another embodiment where a laser is used as light source 102, Rayleigh light wavelength may be estimated using a calibrated model of laser behavior across temperature and current.

In another embodiment, the Rayleigh light is instead imaged on the same spectrometer 300 and image sensor 114 used to measure the Raman signal. Thus, the Rayleigh light wavelength is determined using the spectrometer 300 and image sensor 114 as is used to measure the analyte signal. A benefit of this approach is that if the optical system drifts, for example undergoing small mechanical motion due to being dropped, the resulting errors in wavenumber calibration of the optical system are reduced because both the estimated wavelength of the Rayleigh light and the wavelength of each pixel are generally expected to shift in lockstep.

For example, consider an optical system in which the spectrometer undergoes a shift of δ nm so that a pixel that once responded to wavelength λ now responds to wavelength λ+δ. Alternatively, there may simply be an error of δ nm in the wavelength calibration of the optical system. If the wavelength of the Rayleigh light is estimated independently of the Raman spectrometer the estimated wavenumber of this pixel is given by Equation 1.

The true wavenumber of this pixel, however, is $$\eta_\delta = \left(\frac{1}{\lambda_0} - \frac{1}{\lambda+\delta}\right) * 1 \times 10^7 \quad (2)$$

The error in the estimated wavenumber is then:

$$e = \eta_\delta - \eta \quad (3)$$

$$= \left(\frac{1}{\lambda_0} - \frac{1}{\lambda+\delta}\right) * 1 \times 10^7 - \left(\frac{1}{\lambda_0} - \frac{1}{\lambda}\right) * 1 \times 10^7$$

$$= \left(\frac{1}{\lambda} - \frac{1}{\lambda+\delta}\right) * 1 \times 10^7$$

The rate at which error is incurred as a function of wavelength shift δ is $$\frac{de}{d\delta} = 1 \times 10^7 * \left(\frac{1}{\lambda+\delta}\right)^2 \quad (4)$$

Evaluating this at δ=0 (for small errors) we have $$\left.\frac{de}{d\delta}\right|_{\delta=0} = 1 \times 10^7 * \left(\frac{1}{\lambda}\right)^2 \quad (5)$$

For example, at λ=900 nm (near the center of a wavelength range used in one embodiment) the error incurred would be 12.3 cm$^{-1}$ per nm of shift.

If the wavelength of the Rayleigh light is instead also measured using the same image sensor 114 as is used to measure the Raman signature, the nature of the error changes. The nature of the error is such that the apparent laser wavelength as measured by the image sensor 114 shifts by −δ, and this error cancels a portion of the error for the pixel of interest. The true wavenumber of the pixel is still given by Equation 2, but the estimated wavenumber is now given by $$\hat{\eta} = \left(\frac{1}{\lambda_0-\delta} - \frac{1}{\lambda}\right) * 1 \times 10^7 \quad (6)$$

The error in the estimated wavenumber is then $$\hat{e} = \eta_\delta - \hat{\eta} \quad (7)$$

$$= \left(\frac{1}{\lambda_0} - \frac{1}{\lambda+\delta}\right) * 1 \times 10^7 - \left(\frac{1}{\lambda_0-\delta} - \frac{1}{\lambda}\right) * 1 \times 10^7$$

$$= \left(\frac{1}{\lambda_0} + \frac{1}{\lambda} - \frac{1}{\lambda_0-\delta} - \frac{1}{\lambda+\delta}\right) * 1 \times 10^7$$

The rate at which error is incurred as a function of wavelength shift δ is $$\frac{d\hat{e}}{d\delta} = 1 \times 10^7 * \left[-\left(\frac{1}{\lambda_0-\delta}\right)^2 + \left(\frac{1}{\lambda+\delta}\right)^2\right] \quad (8)$$

Evaluating this at δ=0 (again, for small errors) we have $$\left.\frac{d\hat{e}}{d\delta}\right|_{\delta=0} = 1 \times 10^7 * \left[\left(\frac{1}{\lambda}\right)^2 - \left(\frac{1}{\lambda_0}\right)^2\right] \quad (9)$$

Now at λ=900 nm and $\lambda_0$=830 nm the error incurred would be −2.2 cm$^{-1}$ per nm of shift, more than an 82% reduction in absolute error (plus a change in sign).

More generally, the relative size of the errors is $$\frac{|\hat{e}'|}{|e'|} = \frac{\left|\left(\frac{1}{\lambda}\right)^2 - \left(\frac{1}{\lambda_0}\right)^2\right|}{\left(\frac{1}{\lambda}\right)^2} \quad (10)$$

$$= \frac{\left(\frac{1}{\lambda_0}\right)^2 - \left(\frac{1}{\lambda}\right)^2}{\left(\frac{1}{\lambda}\right)^2}$$

$$= \left(\frac{\lambda}{\lambda_0}\right)^2 - 1$$

Thus as long as $\lambda/\lambda_0 < \sqrt{2}$, errors are reduced (i.e., $|\hat{e}'|/|e'|<1$). In one embodiment, the Rayleigh light wavelength is about 830 nm and the longest observation wavelength is about 950 nm, so $\lambda/\lambda_0 \leq 950/830 = 1{:}14 < \sqrt{2}$, and consequently errors are reduced by using this method.

Additional Considerations

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs executed by a processor, equivalent electrical circuits, microcode, or the like. The described operations may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Although the detailed description contains many specifics, these should not be construed as limiting the scope of the invention, but merely as illustrating different examples and aspects of the invention. It should be appreciated that the scope of the invention includes other embodiments not discussed in detail above. Various other modifications, changes and variations which will be apparent to those skilled in the art may be made in the arrangement and details of the apparatus of the invention disclosed herein without departing from the spirit and scope of the invention.

What is claimed is:

1. An optical system configured to receive elastically scattered and inelastically scattered light from a sample illuminated by a light source, the optical system comprising:
   an image sensor comprising a measurement region, the measurement region configured to receive the inelastically scattered light and a portion of the elastically scattered light;
   a dispersive optical element optically positioned between the image sensor and the sample, the dispersive optical element configured to disperse the inelastically scattered light and the portion of the elastically scattered light by wavelength towards the measurement region; and
   a long-pass filter optically positioned between the image sensor and the sample, the long-pass filter configured to transmit the inelastically scattered light and the portion of the elastically scattered light, and further configured to reflect a remainder of the elastically scattered light.

2. The optical system of claim 1 wherein the long-pass filter comprises a critical angle, the critical angle of the long-pass filter configured so that substantially all stray light incident on the long-pass filter at an incidence angle greater than the critical angle, measured off normal incidence, is not incident within the measurement region.

3. The optical system of claim 1 wherein the long-pass filter is configured to transmit the portion of elastically scattered light at near normal incidence.

4. The optical system of claim 1 wherein the long-pass filter is configured to transmit the portion of elastically scattered light at angles less than a critical angle of the long-pass filter.

5. The optical system of claim 1 wherein the long-pass filter is configured such that the portion of elastically scattered light incident on the measurement region is at least one order of magnitude smaller in intensity than the remainder of the elastically scattered light reflected from the long-pass filter.

6. The optical system of claim 3 wherein the long-pass filter is configured such that the portion of elastically scattered light incident on the measurement region is between 6-10 orders of magnitude, inclusive, smaller in intensity than the remainder of the elastically scattered light reflected from the long-pass filter.

7. The optical system of claim 1 wherein the long-pass filter is configured such that an intensity of the portion of elastically scattered light incident on the measurement region is sufficiently low so as not to saturate the image sensor, and is sufficiently high such that the portion of elastically scattered light is distinguishable from noise.

8. The optical system of claim 1 wherein the long-pass filter transitions between transmission and reflection over a range of wavelengths between 700 and 1700 nanometers, inclusive.

9. The optical system of claim 1 comprising a light source configured to emit light at an emission wavelength between 700 and 1700 nanometers, inclusive.

10. The optical system of claim 1 comprising one or more front end long-pass filters optically positioned between the sample and the long-pass filter.

11. The optical system of claim 10 wherein the front end long-pass filters comprise at least a plurality of long-pass filters optically positioned back to back.

12. The optical system of claim 10 wherein the front end long-pass filters comprise at least three long-pass filters, each oriented at a different angle with respect to each other.

13. The optical system of claim 10 wherein the front end long-pass filters comprise optical density (OD) 6 filters.

14. The optical system of claim 10 wherein the front end long-pass filters are separated by a physical distance from the long-pass filter.

15. The optical system of claim 1 wherein the image sensor, dispersive optical element, and long-pass filter are contained within an enclosed optical cavity comprising interior surfaces configured to absorb stray light.

16. An optical system configured to receive elastically scattered and inelastically scattered light from a sample illuminated by a light source, the optical system comprising:
   a means for sensing incident light, the sensing means comprising a measurement region, the measurement region configured to receive the inelastically scattered light and a portion of the elastically scattered light;
   a means for dispersing light by wavelength, the dispersive means optically positioned between the sensing means and the sample, the dispersive means configured to disperse the inelastically scattered light and the portion of the elastically scattered light towards the measurement region; and
   a means for long-pass filtering light, the filtering means optically positioned between the sensing means and the sample, the filtering means configured to transmit the inelastically scattered light and the portion of the elastically scattered light, and further configured to reflect a remainder of the elastically scattered light.

17. A method comprising:

determining intensity data as a function of wavelength for a plurality of wavelengths of inelastically scattered light incident on an image sensor;

converting the wavelength intensity data to wavenumber intensity data by converting between wavelengths and wavenumbers;

determining a wavelength of elastically scattered light that is also incident on the same image sensor;

converting the wavelength of the elastically scattered light to a wavenumber of the elastically scattered light;

determining a plurality of interfering Raman peak wavenumbers based on the wavenumber of the elastically scattered light;

subtracting an interference signal from the wavenumber intensity data to generate subtracted intensity data, the interference signal at each wavenumber based on the plurality of interfering Raman peak wavenumbers; and determining a concentration of an analyte based on the subtracted intensity data.

* * * * *